United States Patent
Hoyler

[11] 3,855,507
[45] Dec. 17, 1974

[54] SELF HEATING CAPACITORS
[75] Inventor: Gerhard Hoyler, Munich, Germany
[73] Assignee: Siemens Aktiengesellschaft, Berlin and Munich, Germany
[22] Filed: June 4, 1973
[21] Appl. No.: 366,556

[30] Foreign Application Priority Data
June 7, 1972 Germany.......................... 2227751

[52] U.S. Cl.................................. 317/258, 317/260
[51] Int. Cl............................................... H01g 3/15
[58] Field of Search ........... 29/25.42; 317/260, 261, 317/258

[56] References Cited
UNITED STATES PATENTS

| | | | |
|---|---|---|---|
| 3,248,620 | 4/1966 | Hart................................ | 317/260 X |
| 3,303,550 | 2/1967 | Banzhof.......................... | 317/258 X |
| 3,410,744 | 11/1968 | Bold................................ | 317/258 |
| 3,614,561 | 10/1971 | Behn................................ | 317/258 |

FOREIGN PATENTS OR APPLICATIONS

| | | | |
|---|---|---|---|
| 946,730 | 6/1962 | Great Britain....................... | 317/261 |
| 1,368,431 | 6/1964 | France................................ | 317/260 |

OTHER PUBLICATIONS

Birks, J. B. Modern Dielectric Material London Heywood & Co. 1960 pp. 114, 115, 155, 121.

Primary Examiner—E. A. Goldberg
Attorney, Agent, or Firm—Hill, Gross, Simpson, Van Santen, Steadman, Chiara & Simpson

[57] ABSTRACT

Capacitors and methods of making capacitors in which a support layer of strong material is used to support the conductive and dielectric layer of the capacitor and wherein the support layer does not lie in the electric field of the capacitor. The support layers have a coating of the same material as the dielectric to aid self healing of the capacitor.

1 Claim, 7 Drawing Figures

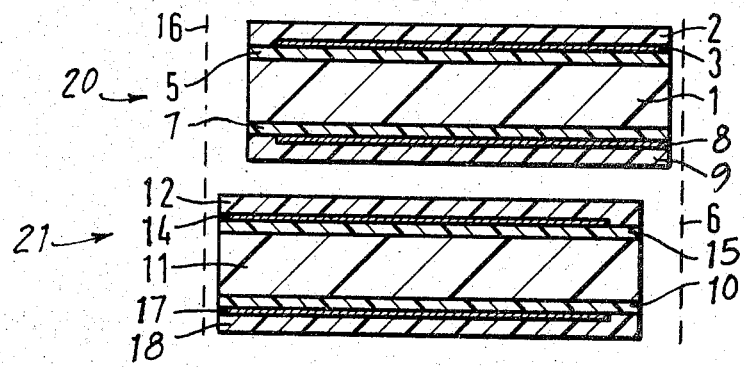
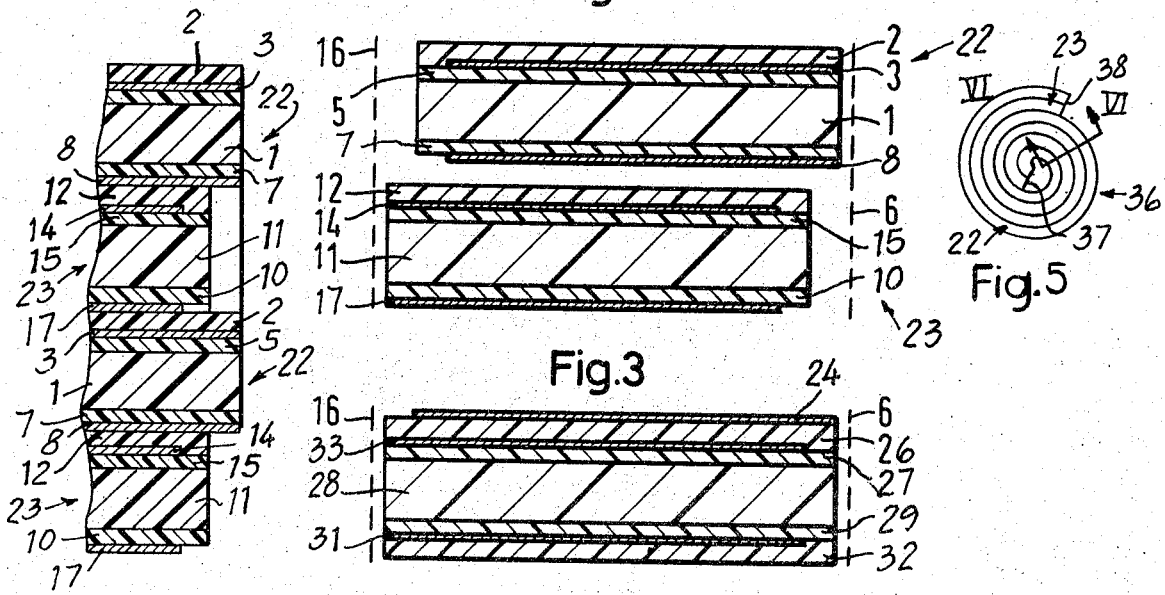
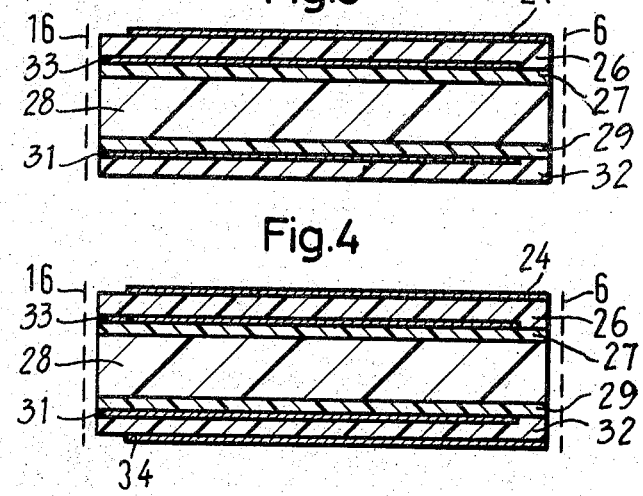

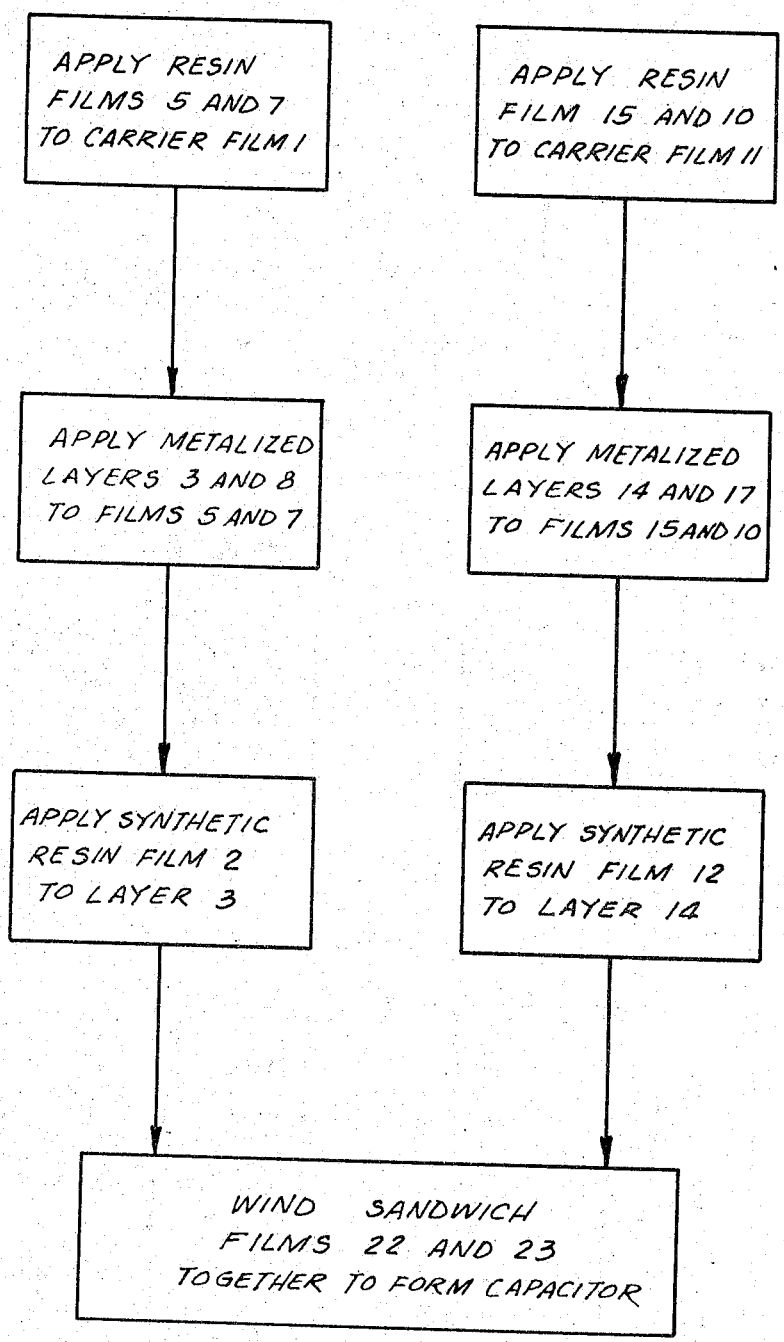

SELF HEATING CAPACITORS

BACKGROUND OF THE INVENTION

1. Field of the Invention

The present invention relates to electrical capacitors, in particular wound or stacked capacitors, having a dielectric consisting of a thin film of plastic insulating material, and metal layers serving as electrodes located on either side of this insulating film.

2. Description of the Prior Art

Capacitors such as disclosed in German Patent Specification No. 1,764,541 which has been laid open to public inspection utilize such plastic insulating and conducting layers, for example. German Patent 1,764,541 was filed on June 24, 1968 and U.S. Pat. Nos. 3,670,378 and 3,728,765 were based on this German application. All of these patents are assigned to the assignee of the present application. U.S. Pat. No. 3,670,378 was filed on June 18, 1969 and issued on June 20, 1972. U.S. Pat. No. 3,728,765 was filed on Nov. 24, 1971 and issued on Apr. 24, 1973.

It is desirable that capacitors of this kind should also be usable as chip capacitors in printed circuits, of the thick-film or thin-film types. Generally, chip capacitors are parallelepiped-shaped and are formed of metallized ceramic, and are provided at two opposite faces with metallized coatings which form the capacitor electrodes. When installed into a circuit, the metal electrodes can be soldered directly to the conductor paths of the proper circuit. The assembled arrangement can also be dipped into a liquid solder such as a liquid tin alloy. The manufacture of capacitors of this sort, however, is relatively expensive.

This type of installation procedure requires that the capacitor may have to be heated to a high temperature such as 230°C or higher. Thus, both of the capacitor electrodes and the dielectric must be able to withstand thermal loads of this order. There are only a few synthetic resin materials which can be used as dielectrics in capacitors of this kind. These primarily consist of polytetrafluoroethylene and its copolymers with hexafluoropropylene or ethylene, and synthetic resin materials having a silicone basis. These synthetic resin materials, especially the former, also have the advantage that when used as the dielectric in a capacitor, an electrical perforation can be isolated by self-healing action at the location of the perforation. A prerequisite for this is that the electrode material should vaporize without trace at the location of the perforation and should not deposit in the perforation hole to form a conductive bridge between the two capacitor electrodes. Consequently, electrodes of readily vaporizable material in the form of an extremely thin film, preferably having a thickness of not more than 0.1 microns, must be used. For such electrode materials, aluminium and zinc are particularly suitable.

Capacitors of this kind are usually referred to as self-healing or regenerative capacitors and they can be manufactured using one of the above-mentioned synthetic resin materials as the capacitor dielectric.

There are some disadvantages in that some of the synthetic resin materials, in particular those having a fluorine basis, have only moderate mechanical strength in comparison with the insulating synthetic resin materials otherwise employed in capacitor technology. For example, the modulus of elasticity of polytetrafluoroethylene is only 5,000 kg/cm$^2$ as compared with the value of 24,000 kg/cm$^2$ for polycarbonates and the value of 30,000 kg/cm$^2$ for polyamides. The processing of thin films of a material having such a low modulus of elasticity, however, is extremely difficult. Also, synthetic resin materials of this kind cannot readily be produced in the form of sufficiently long films, for example, with a suitable extrusion press. Instead, these synthetic resin materials are more readily produced in the form of dispersions or varnishes deposited as thin films on a heat-resistant substrate, and the particles of synthetic resin material contained in the films are sintered or polymerized together by heating the substrate. The resultant thin film is then peeled away from the substrate to form an independent thin film or foil. Only limited film lengths can be produced by this method which are inadequate for continuous metallizing.

Other synthetic resin materials having a high temperature resistance and better mechanical properties, such as, for example, polyimides (modulus of elasticity 30,000 kg/cm$^2$), and from which films of greater length can consequently be produced, are unsuitable for use as dielectrics for self-healing capacitors because the high temperature resistance of such polyaromatic compounds. This is due to the chemical structure which renders self-healing in the event of a perforation extremely difficult or impossible, since the decomposition products produced by the perforation arcing contain a high proportion of carbon which forms a conductive bridge between the capacitor electrodes.

SUMMARY OF THE INVENTION

It is an object of the present invention to provide a capacitor in which the disadvantages of the prior art are eliminated.

According to the invention, there is provided a capacitor comprising a dielectric layer consisting of at least one thin film of solid or plastic insulating material and metal layers serving as electrodes located on either side of and adjacent to said dielectric layer, and at least one carrier film layer constructed of an insulating material having a higher modulus of elasticity than that of the material of said dielectric layer and serving as a support for the capacitor.

Preferably, the carrier layer is located outside the electric field space of the capacitor and does not form part of the capacitor dielectric.

Preferably, there is arranged between the carrier film and the capacitor electrode nearer to it, an intermediate film of the same material as is used for the capacitor dielectric, particularly if this material is suitable for use as the dielectric of a self-healing capacitor. This feature ensures that decomposition products of an electrically conductive nature arising from the supporting film will not render the self-healing process more difficult or impossible in the event of perforation of the capacitor.

In the manufacture of a capacitor in accordance with the invention, the carrier film, which is preferably coiled up in the form of a roll is used as the starting element of the capacitor. The carrier film is preferably in the form of a self-supporting film about 6 to 20 microns thick and is made of a polyimide or a mixed polyimide-polyamide polymer.

Although it is also possible to apply the metallized layers forming one capacitor electrode directly to the carrier film, generally, for the above-mentioned reason, it is usually desirable for the carrier film to be first coated on one side with a continuous film, about 1 micron or less in thickness, of the synthetic resin material which it is intended to use as the capacitor dielectric. This will either be a film of one of the above-mentioned synthetic resin materials having a fluorine basis, or a synthetic resin material having a silicone basis. In the case of the former synthetic resin materials, dispersions of solid particles of the synthetic resin material in a liquid dispersion agent are commercially available. The latter materials are available as varnishes.

The carrier film is preferably drawn continuously from a roll and led through a dipping or spraying-station and finally through a heating zone, before the film with a coating of the synthetic resin material is recoiled. At the dipping or spraying station, the film is guided through a dipping bath either of one of the above-mentioned dispersions or one of the varnishes, thus producing a liquid film on the surface of the supporting film. Alternatively, the liquid film may be sprayed on. In the heating zone, the dispersing agent or solvent is then evaporated and the particles of synthetic resin material contained therein will sinter and/or polymerize together.

The thickness of the resultant film can, of course, be varied in several ways. The use of a higher transfer speed for the carrier film through the dipping bath or the spraying station, as well as the use of a low viscosity dispersing agent or solvent together with the smallest possible grain size of the dispersed particles of synthetic resin material, are all conductive to the production of thin films. It is absolutely essential that the film of synthetic resin material ultimately obtained should cover in a continuous and unbroken manner the desired side of the carrier film, at least on those areas where the capacitor electrode is to be applied. This is also true for the dielectric capacitor films which are to be applied adjacent the capacitor electrodes.

The heating zone through which the coated film passes after the dipping or spraying station, serves to dry the coating produced and to solidify the synthetic resin material particles contained in it so as to form a cohesive, impermeable layer. The temperature in the heating zone is adjusted to correspond to the sintering or polymerization temperature of the synthetic resin material used. This temperature is 380° – 400°C for polytetrafluoroethylene.

The film prepared in this fashion is then metallized, at least on the side carrying the coating of synthetic resin material. This metallization forms one of the capacitor electrodes.

For this purpose, the film is again continuously unreeled from its roll and passed continuously through an evacuated vapor deposition arrangement, and is again recoiled to form a roll.

Vapor deposition is carried out in a known manner. For this purpose, it is convenient if the carrier film has a width which is several times greater than that of the capacitors which are to be produced. When the capacitors are ultimately formed from the carrier film to which the dielectric and the metallic films have been applied, electrical contact of the metal films is necessary and electrodes must be provided. The coil structure contains the continuous carrier film, but the metallizations forming the electrodes, unlike the carrier film and the other films of insulating material, should not extend to the ends of the coiled structure at all points. Instead, the metallized layers forming one capacitor electrode should only extend to only one of the flat ends of the structure, and the metallized layers forming the other capacitor electrode should only extend to the opposite flat end of the coiled capacitor. This may be achieved in a known manner either by leaving narrow strips free between the individual metal parts during the vapor deposition process by using masks, so that after cutting into individual rolls the desired result is obtained, or by starting with a continuous metallized layer and subsequently removing the metal mechanically, or by means of a laser beam, at the desired locations.

After the application of the metallized layer constituting the first capacitor electrode, it is covered by the synthetic resin material film which is to form the capacitor dielectric. Preferably, one of the synthetic resin materials mentioned above and suitable for use as the dielectric of a self-healing capacitor, is used. The process for producing this film is the same as that used for the production of the insulating intermediate film provided between the carrier film and the first capacitor electrode. The thickness of the dielectric film is selected in accordance with the operating voltage to be applied to the capacitor and/or the desired related capacitance of the capacitor.

The synthetic resin material film forming the capacitor dielectric generally is dimensioned such that, not only the previously applied metallized layer, but also the entire side of the carrier film is completely covered by the film forming the dielectric. It is to be noted that films formed from this synthetic resin material are transparent up to thicknesses of several microns, so that in most cases the metallized layers covered by the dielectric film can be clearly seen.

There is no problem in arranging a second metallized layer with respect to the first such layer, such that in the finished capacitor, the space between these two metallized layers in which the carrier film is mounted is a field-free region. If desired, more than two metal films, in different planes, can be arranged upon the carrier film.

The film strips which have been provided with a metallized path in each plane, can be coiled up in the conventional manner to form, the actual capacitor. In addition to the method which involves coiling the film to form a tightly packed cylindrical roll, a method of winding may also be used in which the film band is folded in a zig-zag fashion to form parallelepiped structure. In this structure, because of the arrangement of the metallized layers and also by the use of non-metallized covering layers, it is possible to provide that the metal films reach the surface of the coil structure only at two mutually opposite flat faces thereof, leaving all of the other surface portions free of metal. To these end faces, respective metal layers are then applied, preferably using the well-known Schoop process, which are applied by spraying and thus in a known manner, a stationary connection with the inner metal layers which extend to the relevant end face of the stacked structure is achieved. The metallized layers on the two ends provide the electrical connections to a respective capacitor electrode.

It is particularly advantageous if the strip-like foil structures ultimately obtained having only one metallized path per metallizing plane are coiled onto a cylindrical core which may be wheel or roller-shaped so as to form an annular structure whose internal radius is large compared with the dimensions of the individual capacitors which are to be produced. Such an annular structure is then provided while still on the winding core, with a metallized deposit at each of its end faces, preferably using the Schoop technique, and is annealed at a temperature of between 200° and 250°C and then removed from the core, and finally cut to form the individual capacitors by radial cutting.

For this purpose, a circular saw with a sawblade which has a diameter appropriate to the size of the individual capacitors, can conveniently be used.

Because of the smoothness of the foil structures to be coiled and because of their extremely low total thickness and corresponding extremely low bending stiffness, during the annealing process van der Waal forces between the individual layers in contact with one another can be fully relieved so that, generally speaking, no special measures need to be taken against inadvertent coiling up. Also, the metallizing of the end faces not only provides contact for the capacitor electrodes and combination of the individual metal films to form the electrodes, but also reinforces the cohesion between the individual layers of the capacitor.

The laminar capacitors obtained from such an annular structure can be employed directly as chip capacitors and used in circuits in the same way as prior art chip capacitors made of metallized ceramic material.

Many other advantages, features and additional objects of the present invention will become manifest to those versed in the art upon making reference to the detailed description and the accompanying sheets of drawings in which a preferred structural embodiment incorporating the principles of the present invention is shown by way of illustrative example.

BRIEF DESCRIPTION OF THE DRAWINGS

FIG. 1 is an end view of a capacitor of the invention;

FIG. 2 is an end view of a modification of the invention;

FIG. 3 is an end view of another modification of the invention;

FIG. 4 is an end view of a further modification of the invention;

FIG. 5 is a side view of a coiled capacitor;

FIG. 6 is a sectional view of the capacitor of FIG. 5; and

FIG. 7 is a flow diagram illustrating the method of FIG. 2.

DETAILED DESCRIPTION

FIG. 1 illustrates a pair of composite film sandwiches 20 and 21 which have been formed in accordance with the description given in the summary of the invention. For example, the film sandwich 20 is formed of a carrier film layer 1 which may be 6 to 20 microns thick and may be made of polyimide or a mixed polyimide-polyamide polymer. On the opposite surfaces of the carrier film 1 are applied films 5 and 7 respectively of a synthetic resin material which is intended to be used as the capacitor dielectric. This film may either be synthetic resin material having a fluorine base or a synthetic resin material having a silicone base. A first metallized layer 3 is formed on the film 5 and has one end which extends flush with the ends adjacent a reference plane 6 and has a second end which does not extend to the ends of the films 1 and 5. A synthetic resin material film 2 is formed over the film 3 and provides a dielectric of the capacitor and is formed of a synthetic resin material for use as a dielectric in a self-healing capacitor. A metallized foil 8 is formed on the surface of the film 7 away from the carrier film 1 and a dielectric synthetic resin material layer 9 covers the metallized layer 8. The metallized layers 3 and 8 extend to the right end relative to the figure of the film sandwich 20 but do not extend to the left end relative to the figure of the film sandwich 20.

The second film sandwich 21 is formed with a carrier foil 11 of the same thickness and size as the film 1 and it is coated on opposite surfaces with films 10 and 15 respectively which carry metal foils 17 and 14. Layers 12 and 18 are respectively attached to the metal foils 14 and 17. The metal foil layers 14 and 17 extend to the left end relative to FIG. 1 of the sandwich 21 but do not extend to the right end relative to the Figure.

The two sandwich films 20 and 21 are wound together in a manner similar to that illustrated in FIG. 5 to form a capacitor and are spaced apart in FIG. 1 for purposes of clarity. Metal electrodes extend from the reference plane 6 to engage the right ends relative to FIG. 1 of foils 3 and 8 to make electrical contact and form one plate of the capacitor. A second electrode extends from the plane 16 and makes contact with the foils 14 and 17 which forms the second electrode of the capacitor.

FIG. 2 illustrates a modification of the invention wherein foil sandwiches 22 and 23 which differ from the foil sandwiches 20 and 21 of FIG. 1 in that the layer 9 of foil sandwich 20 is eliminated and the layer 18 of foil sandwich 21 has been eliminated. Except for these differences, the other elements of the foil sandwiches 22 and 23 correspond to like numbered elements in FIG. 1. FIG. 5 is an end view illustrating the foil sandwiches 22 and 23 coiled to form a condenser 36 having a first end 37 at which the coiling commences to an outer end 38. FIG. 6 is an enlarged detail sectional view taken on line V-V in FIG. 6 and it is to be particularly noted that after the coil is formed by the foil sandwiches 22 and 23 as in FIG. 5 that capacitance exists between foils 8 and 14 with the dielectric 12 therebetween as well as between foils 17 and 3 with the dielectric 2 therebetween.

In both of the embodiments of FIGS. 1 and 2, the intermediate films 5, 7, 15 and 10 prevent any undesirable effect of the metal of the carrier foil which may have poor regenerative properties from effecting the regeneration sites produced on perforation. Since for a self-healing perforation to result only one of the two existing regeneration locations need have a high insulation, the intermediate films such as 5 and 7 can be provided at only one side of the carrier foil 1 and the other metal conductive layer may be formed directly on the carrier foil.

After the condensers are formed by coiling as illustrated in FIGS. 5 and 6, liquid metal may be sprayed onto opposite ends of the coil to form the electrodes for the capacitor. Since the metal foil layers 3 and 8 extend to the right end of the capacitor relative to FIGS. 1 and 2, they will make electrical contact with the electrode applied to the right end of the coil and the metal layers 14 and 17 which extend to the left end relative to FIGS. 1 and 2 will form the other electrode of the capacitor.

It is to be realized that the sprayed on metal particles may have to penetrate slightly through the dielectric films which may slightly coat the end of the films which extend toward the edges 6 and 16, but this will be accomplished due to the kinetic energy and temperature of the metal at the time of spraying. It is to be realized, of course, that it can be assured that the ends of the metallized layers can be kept free of dielectric film to assure positive electrical contact between the electrodes and the films. For example, when the polytetrafluoroethylene dispersion or silicone varnish solutions which form the capacitor dielectric are applied, those locations at which electrical contact is to be accomplished may be left uncoated. Alternatively, deposits produced from the dispersion or varnishing may be removed prior to sintering at the marginal zones as for example with a brushing operation.

It has been discovered that coil film sandwiches may be cut to form separate capacitors by utilizing a rotary saw as the cutting tool and that no conductive connection is formed at the face of the cut between the individual metal films providing the cutting speed exceeds a predetermined speed.

FIGS. 3 and 4 illustrate modified sandwich foils which an be used to form capacitors. In the structure of FIG. 3, for example, a carrier foil 28 similar to foil 1 of FIG. 1 is provided with dielectric foils 27 and 29 on opposite surfaces thereof and a metal foil layer 33 is formed on the surface of foil 27 and a metal foil layer 31 is formed on the surface of metal foil layer 29. The foils 31 and 33 extend to the left end relative to FIG. 3 but do not exceed to the right end relative to FIG. 3 of the sandwich.

A dielectric layer 32 is formed over the foil layer 31 and a dielectric layer 26 is formed over the foil layer 33. A metal foil layer 24 is formed on the foil layer 26 and extends to the right end relative to FIG. 3 but does not extend to the left end relative to FIG. 3. When the foil sandwich of FIG. 3 is formed into a coil as illustrated in FIG. 5, the layers 31 and 33 form a first plate of the capacitor and the foil layer 24 forms a second layer of the capacitor. The dielectric 26 between the layers 24 and 33 forms the dielectric of the capacitor as well as the layer 32 which will lie between the foil 31 and the foil 24 when the sandwich of FIG. 3 has been formed into a spiral coil.

FIG. 4 is similar to the foil sandwich of FIG. 3 except that additional foil layer 34 has been formed on the surface of dielectric 32 and its right end extends to the right end relative to FIG. 4 and its left end does not extend to the left end of the sandwich relative to FIG. 4. When the structure of FIG. 4 is coiled, the metal layers 24 and 34 will be in contact and will form one of the plates of the condenser and the layers 33 and 31 will form the other layer of the condenser. The structure of the Figures may also be stacked and form flat condensers as well as coiled condensers.

It is to be noted in all of the embodiments that the carrier foil layers 1, 11 and 28 are outside the electric field of the capacitor. However, high specific capacitances have been achieved with the invention. For example, utilizing the materials previously referred to above, the intermediate films 5 and 7 with the carrier films may have a total thickness of 7 microns and the capacitive dielectric may be produced with film thicknesses of 1 micron or less.

A structure according to FIG. 2 provides the same capacitance per unit area as would be obtained with the capacitor produced by a coiling operation with a metallized polytetrafluoroethylene coil having a thickness of 2.8 microns. Of course, the invention also provides the advantages discussed above which eliminates the problems of the prior art.

What I claim is:

1. A capacitor comprising a dielectric layer consisting of at least one thin film of insulating material from the group consisting of silicone resins and varnishes and capacitor electrodes located respectively on either side of said dielectric layer each of said electrodes being formed of metallic layers of zinc or aluminum having a thickness of not more than .1 microns said metallic layers located on opposite sides of a carrier of polyamide film, the metal layers serving as the first electrode being end contacted by a metal layer and extending to a first end of the capacitor, but not to the second end, the metal layers serving a the second electrode being end contacted by a metal layer and extending to the second end of the capacitor, but not to the first end, said polyamide film serving as a support for the capacitor having a higher modulus of elasticity than the dielectric layer and being located outside the electrical field of the capacitor and covering and contacting each major side of said polyamide film an intermediate film said intermediate film being the same material as said dielectric layer.

* * * * *